US008881823B2

(12) United States Patent
Collins et al.

(10) Patent No.: US 8,881,823 B2
(45) Date of Patent: Nov. 11, 2014

(54) ENVIRONMENTALLY FRIENDLY LOW TEMPERATURE BREAKER SYSTEMS AND RELATED METHODS

(75) Inventors: Natalia Collins, Spring, TX (US); Kingsley Nzeadibe, Houston, TX (US); Stephen W. Almond, Spring, TX (US); Carl Thaemlitz, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 461 days.

(21) Appl. No.: 13/099,564

(22) Filed: May 3, 2011

(65) Prior Publication Data

US 2012/0279711 A1    Nov. 8, 2012

(51) Int. Cl.
*E21B 37/06* (2006.01)
*C09K 8/508* (2006.01)
*C09K 8/524* (2006.01)

(52) U.S. Cl.
CPC .................. *C09K 8/508* (2013.01); *C09K 8/524* (2013.01)
USPC ........... 166/312; 166/300; 166/304; 166/307; 166/376

(58) Field of Classification Search
CPC ............................ E21B 37/06; C09K 2208/26
See application file for complete search history.

(56) References Cited

U.S. PATENT DOCUMENTS

| | | |
|---|---|---|
| 104,950 A | 7/1870 | Fuller |
| 139,298 A | 5/1873 | Danforth et al. |
| 142,166 A | 8/1873 | Kromer |
| 182,761 A | 10/1876 | Kelly |
| 209,108 A | 10/1878 | Brokhahne |
| 3,333,634 A | 8/1967 | Townsend et al. |
| 3,684,720 A | 8/1972 | Richardson |
| 3,889,753 A | 6/1975 | Richardson |
| 4,089,787 A | 5/1978 | Lybarger et al. |
| 4,090,563 A | 5/1978 | Lybarger et al. |
| 4,353,805 A | 10/1982 | Kragen et al. |
| 4,428,432 A | 1/1984 | Pabley |
| 4,540,448 A | 9/1985 | Gautier et al. |
| 4,595,512 A | 6/1986 | Tellier et al. |
| 4,708,207 A | 11/1987 | Kalfayan et al. |
| 5,183,122 A | 2/1993 | Rowbotham et al. |
| 5,207,778 A | 5/1993 | Jennings, Jr. |
| 5,259,980 A | 11/1993 | Morris et al. |
| 5,293,942 A | 3/1994 | Gewanter et al. |
| 5,335,733 A | 8/1994 | Sandiford et al. |
| 5,346,010 A | 9/1994 | Adams et al. |
| 5,481,018 A | 1/1996 | Athey et al. |
| 5,529,125 A | 6/1996 | Di Lullo Arias et al. |
| 5,672,279 A | 9/1997 | Sargent et al. |
| 5,783,524 A | 7/1998 | Greindl et al. |
| 5,786,313 A | 7/1998 | Schneider et al. |
| 5,897,699 A | 4/1999 | Chatterji et al. |
| 5,979,557 A | 11/1999 | Card et al. |
| 6,063,738 A | 5/2000 | Chatterji et al. |
| 6,140,277 A | 10/2000 | Tibbles et al. |
| 6,165,947 A | 12/2000 | Chang et al. |
| 6,263,967 B1 | 7/2001 | Morris et al. |
| 6,315,045 B1 | 11/2001 | Brezinski |
| 6,436,880 B1 | 8/2002 | Frenier |
| 6,525,011 B2 | 2/2003 | Brezinski |
| 6,534,448 B1 | 3/2003 | Brezinski |
| 6,547,871 B2 | 4/2003 | Chatterji et al. |
| 6,549,814 B1 | 4/2003 | Strutz et al. |
| 6,569,814 B1 | 5/2003 | Brady et al. |
| 6,706,668 B2 | 3/2004 | Brezinski |
| 6,746,611 B2 | 6/2004 | Davidson |
| 6,762,154 B2 | 7/2004 | Lungwitz et al. |
| 6,806,236 B2 | 10/2004 | Frenier et al. |
| 6,828,280 B2 | 12/2004 | England et al. |
| 6,881,709 B2 | 4/2005 | Nelson et al. |
| 6,903,054 B2 | 6/2005 | Fu et al. |
| 6,924,253 B2 | 8/2005 | Palmer et al. |
| 6,929,070 B2 | 8/2005 | Fu et al. |
| 6,978,838 B2 | 12/2005 | Parlar et al. |
| 6,984,705 B2 | 1/2006 | Chang et al. |
| 6,987,083 B2 | 1/2006 | Phillippi et al. |
| 7,028,775 B2 | 4/2006 | Fu et al. |
| 7,036,585 B2 | 5/2006 | Zhou et al. |
| 7,052,901 B2 | 5/2006 | Crews |
| 7,059,414 B2 | 6/2006 | Rae et al. |

(Continued)

FOREIGN PATENT DOCUMENTS

| | | |
|---|---|---|
| EP | 0073599 A1 | 3/1983 |
| EP | 0976911 A1 | 2/2000 |

(Continued)

OTHER PUBLICATIONS

International Search Report and Written Opinion for PCT/GB2012/000406.
Abrams et al., "The Development and Application of a High PH Acid Stimulation System for a Deep Mississippi Gas Well," American Institute of Mining, Metallurgical and Petroleum Engineers, Inc., 53rd Annual Fall Technical Conference and Exhibition held in Houston, TX, 1978, SPE 7565.

(Continued)

*Primary Examiner* — Zakiya W Bates
(74) *Attorney, Agent, or Firm* — McDermott Will & Emery LLP; Holly Soehnge (57) ABSTRACT

An embodiment of the present invention includes a method comprising: (a) providing a filter cake on a surface in a subterranean formation, the filter cake comprising a polymer and a bridging agent; (b) providing a filter cake clean-up fluid that comprises an aqueous fluid and L-glutamic acid N,N-diacetic acid; and (c) contacting the filter cake with the filter cake clean-up fluid so that a portion of the subterranean formation neighboring the filter cake has a regain permeability of at least about 86%.

20 Claims, 4 Drawing Sheets

(56) References Cited

U.S. PATENT DOCUMENTS

| | | | |
|---|---|---|---|
| 7,069,994 B2 | 7/2006 | Cooke, Jr. | |
| 7,114,567 B2 | 10/2006 | Chan et al. | |
| 7,159,659 B2 | 1/2007 | Welton et al. | |
| 7,192,908 B2 | 3/2007 | Frenier et al. | |
| 7,208,529 B2 | 4/2007 | Crews | |
| 7,228,904 B2 | 6/2007 | Todd et al. | |
| 7,261,160 B2 | 8/2007 | Welton et al. | |
| 7,299,874 B2 | 11/2007 | Welton et al. | |
| 7,303,012 B2 | 12/2007 | Chan et al. | |
| 7,303,019 B2 | 12/2007 | Welton et al. | |
| 7,306,041 B2 | 12/2007 | Milne et al. | |
| 7,380,602 B2 | 6/2008 | Brady et al. | |
| 7,380,606 B2 | 6/2008 | Pursley et al. | |
| 7,427,584 B2 | 9/2008 | Frenier et al. | |
| 7,589,050 B2 | 9/2009 | Frenier et al. | |
| 7,655,603 B2 | 2/2010 | Crews | |
| 7,687,439 B2 | 3/2010 | Jones et al. | |
| 8,071,511 B2 | 12/2011 | Welton et al. | |
| 8,312,929 B2 | 11/2012 | Frenier et al. | |
| 2002/0070022 A1 | 6/2002 | Chang et al. | |
| 2002/0076803 A1 | 6/2002 | Crews | |
| 2003/0054962 A1 | 3/2003 | England et al. | |
| 2003/0104950 A1 | 6/2003 | Frenier et al. | |
| 2003/0139298 A1 | 7/2003 | Fu et al. | |
| 2003/0166472 A1 | 9/2003 | Parsley et al. | |
| 2004/0009880 A1 | 1/2004 | Fu | |
| 2004/0011527 A1 | 1/2004 | Jones et al. | |
| 2004/0176478 A1 | 9/2004 | Dahayanake et al. | |
| 2004/0177960 A1 | 9/2004 | Chan et al. | |
| 2004/0235677 A1 | 11/2004 | Nguyen et al. | |
| 2004/0254079 A1 | 12/2004 | Frenier et al. | |
| 2005/0124525 A1 | 6/2005 | Hartshorne et al. | |
| 2005/0126781 A1 | 6/2005 | Reddy et al. | |
| 2005/0209108 A1 | 9/2005 | Fu et al. | |
| 2005/0233911 A1 | 10/2005 | Samuel | |
| 2006/0013798 A1 | 1/2006 | Henry et al. | |
| 2006/0014648 A1 | 1/2006 | Milson et al. | |
| 2006/0025321 A1 | 2/2006 | Treybig et al. | |
| 2006/0041028 A1 | 2/2006 | Crews | |
| 2006/0054325 A1 | 3/2006 | Brown et al. | |
| 2006/0131022 A1 | 6/2006 | Rae et al. | |
| 2006/0180309 A1 | 8/2006 | Welton et al. | |
| 2006/0180310 A1 | 8/2006 | Welton et al. | |
| 2006/0183646 A1 | 8/2006 | Welton et al. | |
| 2006/0258541 A1 | 11/2006 | Crews | |
| 2007/0060482 A1 | 3/2007 | Welton et al. | |
| 2007/0158067 A1 | 7/2007 | Xiao et al. | |
| 2007/0213233 A1 | 9/2007 | Freeman et al. | |
| 2007/0281868 A1 | 12/2007 | Pauls et al. | |
| 2008/0035339 A1 | 2/2008 | Welton et al. | |
| 2008/0035340 A1 | 2/2008 | Welton et al. | |
| 2008/0039347 A1 | 2/2008 | Welton et al. | |
| 2008/0190609 A1 | 8/2008 | Robb et al. | |
| 2008/0194427 A1 | 8/2008 | Welton et al. | |
| 2008/0194428 A1 | 8/2008 | Welton et al. | |
| 2008/0194430 A1 | 8/2008 | Welton et al. | |
| 2008/0200354 A1 | 8/2008 | Jones et al. | |
| 2008/0287324 A1 | 11/2008 | Pursley et al. | |
| 2009/0008095 A1* | 1/2009 | Duncum et al. | 166/292 |
| 2009/0042748 A1 | 2/2009 | Fuller | |
| 2009/0042750 A1 | 2/2009 | Pauls et al. | |
| 2009/0192054 A1 | 7/2009 | Frenier et al. | |
| 2009/0192057 A1 | 7/2009 | Frenier et al. | |
| 2009/0264325 A1 | 10/2009 | Atkins et al. | |
| 2009/0291863 A1 | 11/2009 | Welton et al. | |
| 2010/0137168 A1 | 6/2010 | Quintero et al. | |
| 2010/0212896 A1 | 8/2010 | Navarro et al. | |
| 2010/0276152 A1 | 11/2010 | De Wolf et al. | |
| 2010/0311622 A1 | 12/2010 | Knox | |
| 2011/0028358 A1 | 2/2011 | Welton et al. | |
| 2011/0053811 A1 | 3/2011 | Horton et al. | |
| 2011/0059873 A1 | 3/2011 | Weerasooriya et al. | |
| 2011/0061870 A1 | 3/2011 | Navarro-Mascarell et al. | |
| 2011/0214874 A1* | 9/2011 | Dakin et al. | 166/311 |
| 2011/0259592 A1 | 10/2011 | Reyes | |
| 2011/0290482 A1 | 12/2011 | Weerasooriya et al. | |
| 2012/0000652 A1* | 1/2012 | Jones et al. | 166/278 |
| 2012/0067576 A1 | 3/2012 | Reyes et al. | |
| 2012/0097392 A1 | 4/2012 | Reyes et al. | |
| 2012/0115759 A1 | 5/2012 | Reyes | |
| 2012/0145401 A1 | 6/2012 | Reyes | |
| 2012/0181033 A1 | 7/2012 | Saini et al. | |
| 2012/0202720 A1 | 8/2012 | de Wolf et al. | |
| 2012/0260938 A1 | 10/2012 | Zack | |
| 2013/0025870 A1 | 1/2013 | Berry et al. | |
| 2013/0213659 A1* | 8/2013 | Luyster et al. | 166/312 |

FOREIGN PATENT DOCUMENTS

| | | | |
|---|---|---|---|
| EP | 1004571 A1 | 5/2000 | |
| EP | 1188772 A2 | 3/2002 | |
| EP | 1520085 A1 | 4/2005 | |
| EP | 1817391 A2 | 8/2007 | |
| EP | 2371923 A1 | 10/2011 | |
| WO | 9640625 A1 | 12/1996 | |
| WO | 0142387 A1 | 6/2001 | |
| WO | 2004/005671 A1 | 1/2004 | |
| WO | 2004/090282 A1 | 10/2004 | |
| WO | 2005/121273 A1 | 12/2005 | |
| WO | WO 2006/054261 A2 | 5/2006 | |
| WO | 2007/022307 A2 | 2/2007 | |
| WO | 092078 A2 | 12/2008 | |
| WO | WO2009/091652 A2 | 7/2009 | |
| WO | WO2009/137399 A2 | 11/2009 | |
| WO | WO 2010/053904 A2 | 5/2010 | |
| WO | 2012/000915 A1 | 1/2012 | |
| WO | 2012/080296 A1 | 6/2012 | |
| WO | 2012/080297 A1 | 6/2012 | |
| WO | 2012/080298 A1 | 6/2012 | |
| WO | 2012/080299 A1 | 6/2012 | |
| WO | 2012/080463 A1 | 6/2012 | |
| WO | 2012/113738 A1 | 8/2012 | |
| WO | 2012/171858 A1 | 12/2012 | |
| WO | 2013/015870 A1 | 1/2013 | |
| WO | 2013115981 A1 | 8/2013 | |

OTHER PUBLICATIONS

"Scale," Sintef Petroleum Research, www.sintef.com, 2006.
AATCC Test Method 149-2002, Sep. 27, 2006.
Advanced Corrosion and Scale Management in Oil and Gas, 2006.
Aker Well Services, 2007.
BASF, Performance Chemicals, not dated.
BASF, Technical Bulletin, Trilon M Types, May 2007.
Chem. Rev. 2007, Designing Small Molecules for Biodegradability; Boethling, R.S.; Sommer, E.; DiFiore, D., pp. 2207-2227.
Chemical Speciation of EDDS and its metal complexes in solution, 1999.
Chemical Stimulation in Near Wellbore Geothermal Formations, Jan. 2007.
Chemosphere vol. 34 Num 4, Biodegradation and Aquatic Toxicity of ADA, 1997.
Environ. Sci. Tech. 2002, Environmental Chemistry of Aminopolycarboxylate Chelating Agents; Bernd Nowack; 36(19), 4009-4016.
Environ Sct Technol, Extraction of Heavy Metals from Soils Using Biodegradable Chelating Agents, 2004.
Fighting Scale—Removal and Prevention, 1999.
Halliburton Top Technology Solutions 2006.
Integrated Risk Analysis for Scale Management in Deepwater Developments, 2005.
IPTC 14932, Challenges During Shallow and Deep Carbonate Reservoirs Stimulation, 2011.
Mahmoud Thesis, TAMU, 2011.
Rohit Mittal Thesis, TAMU.
Schlumberger Oilfield Glossary for Scale, 2007.
Simultaneous Gravel Packing and Filter-Cake Cleanup with Shunt Tubes, 2002.
Six Steps to Successful Sandstone Acidizing, 2008.
SPE 30419, Alternate acid blends for HPHT applications, 1995.

(56) References Cited

OTHER PUBLICATIONS

SPE 31076, Kinetics of Tertiary Reaction of HF on Alumino-Silicates, 1996.
SPE 36907, Improved Success in Acid Stimulations with a New Organic-HF System, 1996.
SPE 80597, a biodegradable chelating agent is developed for stimulation of oil and gas formations, 2003.
SPE 88597, Inhibitor Squeeze Design and Returns Monitoring to Manage Downhole Scale Problem, 2004.
SPE 121464, The optimum injection rate for wormhole propagation: myth or reality? 2009.
SPE 121803, Wormhole formation in carbonates under varying temperature conditions, 2009.
SPE 128091, Impact of Organic Acids/Chelating Agents on the Rheological Properties of an Amidoamine-Oxide Surfactant, 2011.
SPE 132286, Stimulation of Carbonate Reservoirs Using GLDA (Chelating Agent) Solutions, Jun. 2010.
SPE 133497, Optimum Injection Rate of a New Chelate That Can Be Used to Stimulate Carbonate Reservoirs, 2010.
SPE 139815, Sandstone Acidizing Using a New Class of Chelating Agents, 2011.
SPE 139816, Reaction of GLDA with Calcite: Reaction Kinetics and Transport Study, 2011.
SPE 141410, Scale formation prevention during ASP flooding, 2011.
SPE 143086, Effect of Reservoir Fluid Type on the Stimulation of Carbonate Reservoirs Using Chelating Agents, 2011.
SPE 143301, Novel Environmentally Friendly Fluids to Remove Carbonate Minerals from Deep Sandstone Formations, 2011.
SPE 147395, Removing Formation Damage and Stimulation of Deep Illitic-Sandstone Reservoirs Using Green Fluids, 2011.
SPE 149127, When Should We Use Chelating Agents in Carbonate Stimulation?, 2011.
SPE 152716, A New, Low Corrosive Fluid to Stimulate Deep Wells Completed With Cr-based Alloys, 2012.
SPE 157467, Improved Health, Safety and Environmental Profile of a New Field Proven Stimulation Fluid, 2012.
SPE Production and Facilities, 2004, Hot oil and gas wells can be stimulated without acid.
SPE Production and Facilities, 2004, Organic Acids in carbonate acidizing.
International Search Report and Written Opinion for PCT/US2013/021562 dated May 24, 2013.
Kalfayan, Leonard, "Production Enhancement with Acid Stimulation," PennWell Corporation, 2000.
Kalfayan, Leonard, "Production Enhancement with Acid Stimulation," 2nd Ed., PennWell Corporation, 2008.
Dean et al., "Evaluation of 4-Hydroxy-6-Methyl-3-Pyridinecarboxylic Acid and 2,6-Dimethyl-4-Hydroxy-3-Pyridinecarboxylic Acid as Chelating Agents for Iron and Aluminum," Inorganica Chimica Acta 373 (2011), 179-186.
Chaves et al., "Alkylaryl-Amino Derivatives of 3-Hydroxy-4-Pyridinones as Aluminum Chelating Agents with Potential Clinical Application," Journal of Inorganic Biochemistry 97 (2003), 161-172.
Sija et al., "Interactions of Pyridinecarboxylic Acid Chelators with Brain Metail Ions: Cu(II), Zn(II), and Al(III)," Monatsh Chem (2011), 142:399-410.
Walther, John V., "Relation Between Rates of Aluminosilicate Mineral Dissolution, pH, Temperature, and Surface Charge," American Journal of Science, vol. 296, Summer, 1996, p. 693-728.
Clark et al., "Mixing and Aluminum Precipitation," Environ. Sci. Technol. 1993, 27, 2181-2189.
Duckworth et al., "Quantitative Structure—Activity Relationships for Aqueous Metal-Siderophore Complexes," Environ. Sci. Technol. 2009, 43, 343-349.
Fein et al., "Experimental Stud of Aluminum and Calcium Malonate Complexation at 25, 35, and 80° C," Geochimica et Cosmochimica Acta, vol. 59, No. 6, pp. 1053-1062, 1995.

Moeller et al., "The Stabilities and Thermodynamic Functions for the Formation of Aluminium and Mercury (II) Chelates of Certain Polyaminepolyacetic Acids," J. Inorg. Nucl. Chem., 1966, vol. 28, pp. 153 to 159.
Kruck et al., "Synthesis of Feralex a Novel Aluminum/Iron Chelating Compound," Journal of Inorganic Biochemistry 88 (2002), 19-24.
Feng et al., "Aluminum Citrate: Isolationa nd Structural Characterization of a Stable Trinudear Complex," Inorg, Chem. 1990, 29, 408-411.
Gdanski, Kinetics of Tertiary Reaction of HF on Alumino-Silicates; Society of Petroleum Engineers, Inc., International Symposium on Formation Damage Control held in Lafayette, LA, Feb. 1996, SPE 31076.
Shuchart et al., Improved Success in Acid Stimulations with a New Organic-HF System; Society of Petroleum Engineers, Inc., European Petroleum Conference held in Milan, Italy, Oct. 1996, SPE 36907.
Office Action for U.S. Appl. No. 12/053,875 dated Jan. 20, 2011.
Office Action for U.S. Appl. No. 11/499,446 dated Mar. 9, 2011.
Office Action for U.S. Appl. No. 11/499,447 dated Mar. 9, 2011.
Mahmoud et al., Stimulation of Carbonate Reservoirs Using GLDA (Chelating Agent) Solutions, SPE 2010, Society of Petroleum Engineers, SPE 132286.
Mahmoud et al., Optimum Injection Rate of a New Chelate That Can Be Used to Stimulate Carbonate Reservoirs, SPE 2010, Society of Petroleum Engineers, SPE 133497.
Mahmoud et al., Evaluation of a New Environmentally Friendly Chelating Agent for High-Temperature Applications, SPE 2010, Society of Petroleum Engineers, SPE 127923.
Lepage et al., An Environmentally Friendly Stimulation Fluid for High-Temperature Applications, SPE 2009, Society of Petroleum Engineers, SPE 121709.
Mahmoud et al., An Effective Stimulation Fluid for Deep Carbonate Reservoirs: A Core Flood Study, SPE 2010, Society of Petroleum Engineers, SPE 131626.
Lingling et al., Impact of Organic Acids/Chelating Agents on the Rheological Properties of an Amidoamine-Oxide Surfactant, SPE 2011, Society of Petroleum Engineers, SPE 128091.
Nitschke et al., Biodegradation and Aquatic Toxicity of β-Alaninediacetic Acid; Bavarian Sate Bureau for Water Resources Management, Institute for Water Research,Chemosphere, vol. 34, No. 4., pp. 807-815, 1996.
Whitburn et al., Chemical Speciation of Ethylenediamine-N,N'-Disuccinic Acid (EDDS) and its Metal Complexes in Solution, Chemical Speciation and Bioavailability, pp. 85-91, 1999.
Boethling et al., Designing Small Molecules for Biodegradability, Chem. Rev. 2007, 107, 2207-2227.
BASF, The Chemical Company, Drivers, Trends & Regulations Power Point Presentation, not dated.
National Industrial Chemicals Notification and Assessment Scheme, Full Public Report, Methyl Glycine Diacetic Acid, Trisodium Salt, File No. STD/1092, 2004.
Tandy et al., Extraction of Heavy Metals from Soils Using Biodegradable Chelating Agents, Institute of Terrestrial Ecology, Environ. Sci. Technol, 2004, 38, 937-944.
BASF Technical Information TI/EVD 1418e, Trilon M Types; May 2007.
Boethling et al., Designing Small Molecules for Biodegradability; Chem. Rev. 2007, 107, 2207-2227.
Nowac, Environmental Chemistry of Aminopolycarboxylate Chelating Agents; Environ. Sci. Tech, 2002; 36(19), 4009-4016.
Frenier et al.; Use of Highly Acid-Soluble Chelating Agents in Well Stimulation Services, SPE 63242, 2000.
Collins, et al., A Biodegradable Chelating Agent Designed to be an Environmentally Friendly Filter-Cake Breaker, SPE 140816, 2001.
AkzoNobel in the Oilfield Industry Brochure, May 2008.

* cited by examiner

ENVIRONMENTALLY FRIENDLY LOW TEMPERATURE BREAKER SYSTEMS AND RELATED METHODS

BACKGROUND

The present invention relates to subterranean treatment operations, and more particularly, to environmentally friendly, low-temperature filter cake clean-up fluids and related methods.

A subterranean treatment fluid used in connection with a subterranean formation may be any number of fluids (gaseous or liquid) or mixtures of fluids and solids (e.g., solid suspensions, mixtures and emulsions of liquids, gases and solids) used in subterranean operations. An example of a subterranean treatment fluid is a drilling fluid. Drilling fluids are used, inter alia, during subterranean well-drilling operations to, e.g., cool the drill bit, lubricate the rotating drill pipe to prevent it from sticking to the walls of the well bore, prevent blowouts by serving as a hydrostatic head to counteract the sudden entrance into the well bore of high pressure formation fluids, and also remove drill cuttings from the well bore. Another example of a subterranean treatment fluid is a "drill-in and servicing fluid," which includes fluids placed in a subterranean formation from which production has been, is being, or may be cultivated. For example, an operator may begin drilling a subterranean borehole using a drilling fluid, cease drilling at a depth just above that of a potentially productive formation, circulate a sufficient quantity of a drill-in and servicing fluid through the bore hole to completely flush out the drilling fluid, then proceed to drill into the desired formation using the well drill-in and servicing fluid. Drill-in and servicing fluids often are utilized, inter alia, to minimize damage to the permeability of such formations.

Subterranean treatment fluids generally are aqueous-based or oil-based, and may comprise additives such as viscosifiers (e.g., xanthan) and fluid loss control additives (e.g., starches). Subterranean treatment fluids further may comprise bridging agents, which may aid in preventing or reducing loss of the treatment fluid to, inter alia, natural fractures within the subterranean formation. Calcium carbonate is an example of a conventional bridging agent. In certain circumstances, a bridging agent may be designed to form a filter cake so as to plug off a "thief zone" (a portion of a subterranean formation, most commonly encountered during drilling operations, into which a drilling fluid may be lost). Generally, bridging agents are designed to form fast and efficient filter cakes on the walls of the well bores within the producing formations to minimize potential leak-off and damage. Generally, the filter cakes are removed before hydrocarbons are produced from the formation.

Filter cakes are complex structures involving a cake structure formed from solids present in the drilling or drill-in fluids used to form the well bore and polymeric materials that are present in such fluids. Filter cakes are impermeable structures (as can be differentiated from the porous structure of the subterranean rock). Because of this impermeability, it can be difficult to develop effective methodologies to remove the filter cake for production due to the differing equations of state and solubilization parameters that the filter cake has. The kinetics of fluid flow and dissolution of the filter cake are also different from the surrounding rock because they are affected by the polymer and any other components that may be present in the filter cake.

Conventionally, prior to placing the well under production, filter cakes have been removed from well bore walls by contacting the filter cake with one or more subsequent fluids. For example, where an aqueous-based treatment fluid comprising bridging agents is used to establish a filter cake, operators conventionally have employed enzymes and oxidizers to remove the viscosifier and fluid loss control additive, and then used an acid (or an acid precursor that produces an acid after a delay period) to clean up the calcium carbonate bridging agent. The purpose of the acid is to dissolve the acid-soluble materials in the filter cake (e.g., calcium carbonate); the purpose of the oxidizers and enzymes is to degrade the polymer within the filter cake deposited by various polymeric agents used in the drilling or drill-in fluids.

Acid-based removal methods can be problematic, however, because the strong acid often corrodes metallic surfaces of completion equipment (e.g., sand control screens), thereby causing such equipment to potentially prematurely fail. Further, the strong acid may damage the producing formation. Additionally, the strong acid may cause the bridging agent to dissolve prematurely in a specific area of the well bore interval, resulting in the loss of the strong acid into the formation, before it can completely cover the entire well bore interval filter cake. This is especially problematic in wells involving long intervals or deviated well bore geometries.

Acid-based systems also may be difficult to control. At higher temperatures, the hydrolysis reaction is expedited, and the challenge becomes how to slow the reaction rate to cover the entire interval and remove all of the filter cake present therein because the acid will react too rapidly at the well bore. Corrosion problems are also more aggravated at higher temperatures. In addition, some clay minerals are sensitive to low pH and the introduction of a low pH fluid could cause damage to the formation.

As an alternative to acid-based systems some chelating agents have been used such as EDTA, HEDTA, and NTA. However, these chelating agents can have solubility problems in certain brines, and temperature limitations for use.

SUMMARY OF THE INVENTION

The present invention relates to subterranean treatment operations, and more particularly, to environmentally friendly, low-temperature filter cake clean-up fluids and related methods.

In one embodiment, the present invention provides a method comprising: providing a treatment fluid comprising water, a bridging agent, and a polymer; depositing the bridging agent and the polymer as a filter cake along a wall of a well bore in a subterranean formation; and degrading the filter cake with a filter cake clean-up fluid comprising an aqueous fluid and L-glutamic acid N,N-diacetic acid.

In one embodiment, the present invention provides a method comprising: (a) providing a filter cake clean-up fluid comprising an aqueous fluid and L-glutamic acid N,N-diacetic acid; and (b) contacting a filter cake that comprises a polymer and a bridging agent with the filter cake clean-up fluid.

In one embodiment, the present invention provides a method comprising: (a) providing a filter cake on a surface in a subterranean formation, the filter cake comprising a polymer and a bridging agent; (b) providing a filter cake clean-up fluid that comprises an aqueous fluid and L-glutamic acid N,N-diacetic acid; and (c) contacting the filter cake with the filter cake clean-up fluid so that a portion of the subterranean formation neighboring the filter cake has a regain permeability of at least about 86%.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

The present invention relates to subterranean treatment operations, and more particularly, to environmentally friendly, low-temperature filter cake clean-up fluids and related methods.

Although the present invention presents many advantages, only a few will be discussed herein. The filter cake clean-up fluids of the present invention are significantly less corrosive and present reduced handling and short-term/long-term environmental concerns. Specifically, the filter cake clean-up fluids of the present invention have a pH of about 5, which presents less corrosion and handling concerns. They provide for the effective removal of both the solids and polymer components in the filter cake at low temperatures (i.e., about 120° F. or below) in a desired timeframe (i.e., about 48 hours or less). This is believed to eliminate the need for a separate enzyme or oxidizer treatment to remove the polymer or other components that may be present in the designated filter cake. The filter cake clean-up fluids of the present invention are stable at temperatures above about 300° F. The filter cake clean-up fluids also are biodegradable and soluble in a wide range of pH and brines, meaning that within low and high pH ranges, the fluids are effective because the reactions are not pH driven. Consequently, there is no need to create a specific pH range for the chelating agent, which reduces the corrosive potential as compared to other systems. They are believed to be nondamaging for clay minerals. In some embodiments, the filter cake clean-up fluids may allow for delayed filter cake clean up.

It should be noted that there are significant differences between matrix acidizing a sandstone or carbonate formation and removing a filter cake on a sandstone or carbonate reservoir. Matrix acidizing of a carbonate formation does not involve the degradation of polymer and other components. It involves pure formation material. On the other hand, a filter cake comprises polymers, bridging agents (that are not necessarily carbonate or otherwise acid-soluble), weighting agents (e.g., barite), formation fines (e.g., clays), drilling particles, surfactants, and many additional additives. Therefore, removal of a filter cake is much more complex, involving many additional considerations (e.g., kinetics, diffusion coefficients, etc.) and complicating factors. Thus, an agent that is useful in one of these applications is not indicative of its usefulness in the other.

The filter cake clean-up fluids of the present invention comprise an aqueous-based fluid and GLDA, which is a biodegradable polyacidic chelant having four acidic moieties. L-glutamic acid N,N-diacetic acid ("GLDA") is a polyacidic chelant manufactured from a readily biodegradable, renewable, and human-consumable raw material, monosodium glutamate. GLDA dissolves calcium carbonate over wide pH interval, and is highly soluble. A mole of GLDA acid with a natural pH of about 1.6 is capable of dissolving up to two moles of calcium carbonate. Throughout the pH range, GLDA is thermally stable. The term "biodegradable" as used herein refers to a percentage of degradation over a stated period of time. GLDA is biodegradable according to Organisation for Economic Co-operation and Development (OECD) 301D testing protocol in that at least 20% of the GLDA degrades over 28 days using the OECD 301D testing protocol. Chelants such as EDTA and HEDTA do not meet this standard.

The GLDA acts on the calcium ions, $Ca^{2+}$, present in the filter cake. Similarly, it reacts with the divalent ions of the polymer present in the filter cake. Additionally, it is believed that the $pK_a$ value of the material is concentrated enough to be strong enough to act on both the calcium carbonate and the polymer. Compared to other polyacidic chelants, GLDA offers surprisingly lower reaction rates. This allows GLDA to be used in a controlled fashion on a filter cake, which results in even dissolution and dispersion over the entire interval. GLDA is readily soluble, even in a low pH fluid, which is advantageous over other chelating agents such as EDTA, which is not as soluble in such fluids. This solubility allows the kinetics of dissolution to be modified, if desirable. There is also less corrosion potential as GLDA is principally used at higher pH values and can be chloride free.

The GLDA may be included in a filter cake clean-up fluid of the present invention in an amount of about 0.25% to about 25% by volume, and more preferably in an amount of about 5% to about 20% by volume, and in an amount of about 10% to about 15% by volume.

The base fluid utilized in the filter cake clean-up fluids of the present invention may be aqueous-based. The base fluid may comprise fresh water, salt water (e.g., water containing one or more salts dissolved therein), brine (e.g., saturated salt water), or seawater. Generally, the water can be from any source that does not contain an excess of compounds that may adversely affect other components in the breaker fluid. Generally, the base fluid may be present in an amount sufficient to form a pumpable breaker fluid. More particularly, the base fluid typically is present in the breaker fluids of the present invention in an amount up to about 99.99% by volume of the filter cake clean-up fluid.

Optionally, the filter cake clean-up fluids may comprise suitable additives including, but not limited to, corrosion inhibitors, surfactants, iron-reducing agents, and viscosifiers.

If included, examples of corrosion inhibitors that may be suitable for use include ethanol amines, amines, acetylenic alcohols, Mannich condensation products (such as those formed by reacting an aldehyde, a carbonyl containing compound and a nitrogen containing compound), unsaturated carbonyl compounds, unsaturated ether compounds, formamide, formic acid, formates, other sources of carbonyl, iodides, terpenes, and aromatic hydrocarbons, coffee, tobacco, gelatin, cinnamaldehyde, cinnamaldehyde derivatives, acetylenic alcohols, thiocyanates, phosphonates, alkyl phosphonates, fluorinated surfactants, quaternary derivatives of heterocyclic nitrogen bases, quaternary derivatives of halomethylated aromatic compounds, formamides, combinations of such compounds used in conjunction with iodine, quaternary ammonium compounds, and any combination thereof. Corrosion inhibitors that may be suitable are available from Halliburton Energy Services and include: "BARACOR® 95" corrosion inhibitor, "BARACOR® 100" corrosion inhibitor, "BARACOR® 450" corrosion inhibitor, "BARACOR® 700" corrosion inhibitor, "MSA II™" corrosion inhibitor, "MSA III™" corrosion inhibitor, "HAI-404M™" acid corrosion inhibitor, "HAI-81M™" acid corrosion inhibitor, "HAI-OS™" corrosion inhibitor, "HAI-GE™" corrosion inhibitor, and "FDP-S692-03" corrosion inhibitor. Where included, the amount of a corrosion inhibitor to include may range from about 0.1% to about 3% by volume where liquid products are used and from about 0.5% to about 200% by weight where solid products are used.

Suitable iron control agents are available from Halliburton Energy Services and include: "FE-2™" Iron sequestering agent, "FE-2A™" Buffering agent, "FE-3™" Iron control agent, "FE-3A™" Iron control agent, "FE-5A™" Iron control agent, "FERCHEK™" Ferric iron inhibitor, "FERCHEK™ A" Reducing agent, and "FERCHEK™ SC" Iron control system. Other suitable iron control agents include those described in U.S. Pat. Nos. 6,315,045, 6,525,011, 6,534,448, and 6,706,668, which are hereby incorporated by reference.

In some embodiments, the filter cake clean-up fluids of the present invention may include surfactants, e.g., to improve the compatibility of the acidic treatment fluids with other fluids (like any formation fluids) that may be present in the subterranean formation. A person of ordinary skill, with the benefit of this disclosure, will be able to identify the type of surfactant as well as the appropriate concentration of surfactant to be used. Examples of surfactants that may be suitable include, but are not limited to, ethoxylated nonyl phenol phosphate esters, nonionic surfactants, cationic surfactants, anionic surfactants, amphoteric/zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates (e.g., as described in U.S. Patent Application No. 2006/0183646 and U.S. Pat. Nos. 7,299,874, 7,303,019, 7,159,659, which are incorporated herein by reference), hydrolyzed keratin (e.g., as described in U.S. Pat. No. 6,547,871, the which is incorporated herein by reference), sulfosuccinates, taurates, amine oxides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and mixtures thereof. Suitable surfactants may be used in a liquid or powder form. Where used, the surfactants are present in the fluid in an amount sufficient to prevent incompatibility with formation fluids or well bore fluids. In an embodiment where liquid surfactants are used, the surfactants may be present in an amount in the range of from about 0.01% to about 5.0% by volume of the acidic treatment fluid. In one embodiment, the liquid surfactants are present in an amount in the range of from about 0.01% to about 2.0% by volume of the acidic treatment fluid. In embodiments where powdered surfactants are used, the surfactants may be present in an amount in the range of from about 0.001% to about 0.5% by weight of the acidic treatment fluid.

Examples of surfactants that may be suitable include non-emulsifiers commercially available from Halliburton Energy Services, Inc., under the tradenames "LOSURF-300M™" nonionic surfactant, "LOSURF-357™" nonionic surfactant, "LOSURF-400™" surfactant, "LOSURF-2000S™" solid surfactant, "LOSURF-2000M™" solid surfactant, and "LOSURF-259™" nonionic non-emulsifier. Another example of a surfactant that may be suitable is a non-emulsifier commercially available from Halliburton Energy Services, Inc., under the tradename "NEA-96M™" surfactant. Other examples of surfactants that may be suitable that are commercially available from Halliburton Energy Services, Inc., are products "SGA-1," "EFS-1," "EFS-2," "EFS-3," and "EFS-4." Other surfactants that may be suitable may include betaines and quaternary ammonium compounds. Examples of betaines that are commercially available include "MIRATAINE.R™" and "MIRATAINE™ BET 0-30" both available from Rhodia, and "REWOTERIC AM TEG™" available from Degussa. Examples of commercially available quaternary ammonium compounds include "ARQUAD.R™ 22-80" and "ETHOQUAD.R™ O/12 PG" both available from Akzo Nobel and "GENAMIN KDMP" available from Clariant. It may be beneficial to add a surfactant to a fluid of the present invention as that fluid is being pumped downhole, among other things, to help reduce the possibility of forming emulsions with the formation crude oil. Furthermore, in some embodiments, microemulsion additives optionally may be included in the filter cake clean-up fluids of the present invention. Examples of microemulsion additives that may be suitable include, but are not limited to, "PEN-88M™" surfactant, "PEN-88HT™" surfactant, "SSO-21E" surfactant, "SSO-21MW™" surfactant, GASPERM 1000™ Microemulsion Surfactant/Solvent Additive, which are all commercially available from Halliburton Energy Services, Inc.,. Other microemulsion additives that may be suitable are "MA-845" additive and "MA-844" additive, commercially available from CESI Chemical; "SHALESURF 1000" additive, commercially available from Frac Tech Services of Aledo, Tex.; and those disclosed in U.S. Pat. No. 6,920,076, which is incorporated by reference.

It should be noted that, in some embodiments, it may be beneficial to add a surfactant to a fluid of the present invention as that fluid is being pumped downhole to help eliminate the possibility of foaming. "BARA-DEFOAM®" products commercially available from Halliburton Energy Services, Inc. are examples of useful defoamers for such applications.

In alternative embodiments where it is desirable to foam the filter cake clean-up fluids of the present invention, surfactants such as "HY-CLEAN(HC-2)™" surface-active suspending agent or "AQF-2™" additive, both commercially available from Halliburton Energy Services, Inc., may be used. Foaming may be desirable, for example, in underbalanced drilling and completion operations. Additional examples of foaming agents that may be utilized to foam and stabilize the filter cake clean-up fluids of this invention include, but are not limited to, betaines, amine oxides, methyl ester sulfonates, alkylamidobetaines such as cocoamidopropyl betaine, alpha-olefin sulfonate, trimethyltallowammonium chloride, $C_8$ to $C_{22}$ alkylethoxylate sulfate and trimethylcocoammonium chloride. Other suitable surfactants that may or may not be foamers in a particular application that are available from Halliburton Energy Services, Inc. include: "19N," "G-SPERSE" dispersant, "HOWCO-SUDS™" foaming agent, and "A-SPERSE™" dispersing aid for acid additives. Other suitable foaming agents and foam stabilizing agents may be included as well, which will be known to those skilled in the art with the benefit of this disclosure.

In some embodiments, it may be desirable to add a viscosifier to the filter cake clean-up fluids of the present invention. For example, in a situation where it is desirable to pull non-acid soluble solids back out of the well bore once the filter cake breaks or to weight up the fluid or provide friction reduction to the fluid (e.g., when used with coiled tubing). The viscosifier may be advantageous to slow reactions between the GLDA of the filter cake clean-up fluid and the targeted filter cake. Suitable viscosifiers that may be included in the fluids of the present invention typically comprise biopolymers, synthetic polymers, or any combination thereof. A variety of viscosifiers can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. The viscosifiers may be biopolymers comprising natural, modified and derivatized polysaccharides, and derivatives thereof that contain one or more of these monosaccharide units: galactose, mannose, glucoside, glucose, xylose, arabinose, fructose, glucuronic acid, or pyranosyl sulfate. Suitable viscosifiers include, but are not limited to, guar, hydroxypropyl guar, carboxymethyl guar, carboxymethylhydroxypropyl guar, other derivatives of guar gum, xanthan, galactomannan gums, cellulose, hydroxyethylcellulose, carboxymethylcellulose, carboxymethylhydroxyethylcellulose and other cellulose derivatives, derivatives thereof, and combinations thereof. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone.

Generally, the amount of a viscosifier that may be included in a fluid for use in conjunction with the present invention depends on the viscosity desired. Thus, the amount to include will be an amount effective to achieve a desired viscosity effect. In certain exemplary embodiments of the present invention, the viscosifier may be present in the filter cake clean-up fluid in an amount in the range of from about 0.1% to about 10% by weight of the filter cake clean-up fluid. In other exemplary embodiments, the viscosifier may be present in the range of from about 0.1% to about 2% by weight of the filter cake clean-up fluid. One skilled in the art, with the benefit of this disclosure, will recognize the appropriate viscosifier and amount of the viscosifier to use for a particular application.

In certain embodiments, the filter cake clean-up fluids of the present invention also may comprise any additional additives that may be suitable in a particular application of the present invention, including, but not limited to, any of the following: hydrate inhibitors, clay stabilizers, bactericides, salt substitutes (such as tetramethyl ammonium chloride), relative permeability modifiers (such as "HPT-1™" chemical additive available from Halliburton Energy Services, Inc.), sulfide scavengers, fibers, nanoparticles, consolidating agents (such as resins and/or tackifiers), pH control additives, fluid loss control additives, scale inhibitors, asphaltene inhibitors, paraffin inhibitors, salts, bactericides, crosslinkers, stabilizers, foamers, defoamers, emulsifiers, demulsifiers, iron control agents, solvents, mutual solvents, particulate diverters, gas phase, carbon dioxide, nitrogen, friction reducers, combinations thereof, or the like. The filter cake clean-up fluids of the present invention also may include other additives that may be suitable for a given application, as will be recognized by a person of ordinary skill in the art, with the benefit of this disclosure.

In some embodiments, the filter cake clean-up fluids of the present invention may be used as a spotting fluid, which is a small volume or pill of fluid placed in a well bore annulus to free differentially stuck pipe. Oil-base mud is the traditional stuck-pipe spotting fluid. Speed in mixing and placing the spot is of primary importance to successfully freeing pipe. Because of concern about mud disposal, spots used offshore are either synthetic-based emulsions or benign water-base formulations. Each type is supplied as prepackaged concentrate designed for rapid access and mixing at the rig. A spot frees pipe by covering the stuck region. It presumably breaks up the filter cake, allowing the spot to migrate into cracks in the cake and between the pipe and the cake, reducing the stuck area and allowing pipe to be pulled free.

In other embodiments, a filter cake clean-up fluid of the present invention may be used after drilling is complete to remove damage from the well bore. The fluid may be introduced to an area of the well bore where a filter cake has been placed. The fluid may be spotted as a pill, which is a relatively small volume of the fluid. The residence time for removal of the filter cake is dependent on temperature. It can vary from hours to days. An average residence time may be about 8 hours to about 12 hours. Completion equipment may be placed downhole during this time. To recover the fluid, the hydrostatic pressure may be decreased.

In some embodiments, the filter cakes to which the filter cake clean-up fluids of the present invention will be applied comprise bridging agents that include, but are not limited to, calcium carbonate, magnesium citrate, calcium citrate, calcium succinate, calcium maleate, calcium tartrate, magnesium tartrate, bismuth citrate, and the hydrates thereof. Generally the bridging agent particle size is in the range of from about 1 micron to about 600 microns. Preferably, the bridging particle size is in the range of from about 1 to about 200 microns, but may vary from formation to formation. The particle size used is determined by the pore throat size of the formation. The filter cake may also comprise a variety of fluid loss control agents including, but not limited to, starch, starch ether derivatives, hydroxyethylcellulose, cross-linked hydroxyethylcellulose and mixtures thereof. The drilling or servicing fluid composition may also contain a hydratable polymer solid suspending agent. A variety of hydratable polymer solid suspending agents can be utilized, including, but not limited to, biopolymers such as xanthan and succinoglycan, cellulose derivatives such as hydroxyethylcellulose and guar and its derivatives such as hydroxypropyl guar.

Preferably, the filter cake compositions of this invention comprise bridging agents such as calcium carbonate, magnesium citrate, calcium citrate, calcium succinate, calcium malate, calcium tartrate, magnesium tartrate, bismuth citrate, and hydrates thereof. The specific gravity of the bridging agent in the filter cake composition is preferably less than about 3.2 and more preferably less than about 2.75. The bridging agent particle size is generally between 1 and 600 microns and preferably between 1 and 200 microns.

To facilitate a better understanding of the present invention, the following examples are given. In no way should the following examples be read to limit, or to define, the scope of the invention.

EXAMPLE 1

Figure 1A:
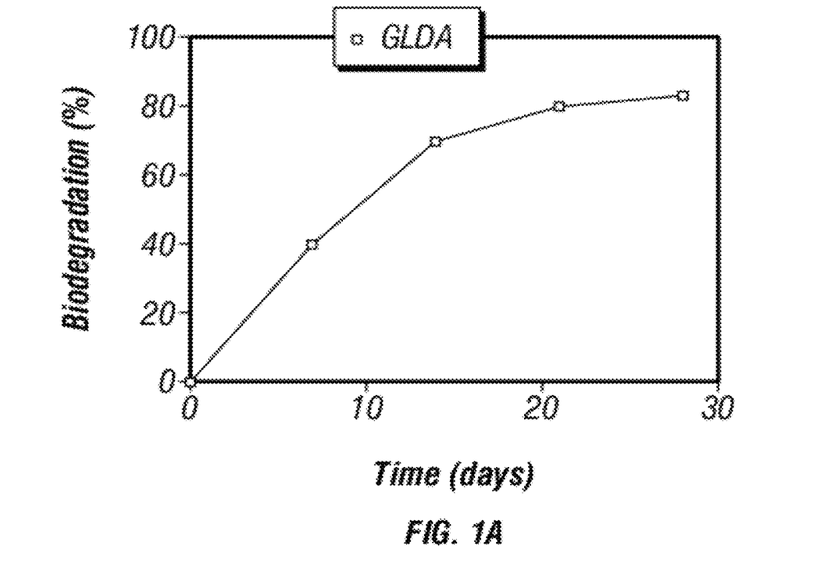
FIG. 1A-1B shows data on the biodegradation of chelants.
Figure 1B:
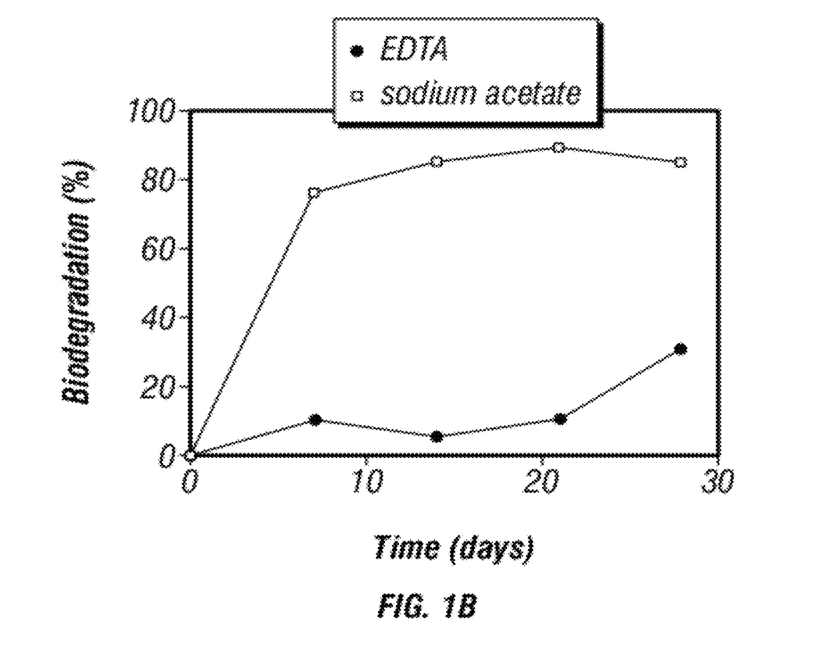

GLDA was identified as an eco-friendly chelating agent that is biodegradable, environmentally friendly, and miscible in multivalent brines carrier fluids. In one biodegradability test following Organisation for Economic Co-operation and Development ("OECD") 301 D Closed Bottle Test protocol, approximately 80% of GLDA biodegraded after about 28 days. FIG. 1A shows a plot of this result. The same protocol was used to test EDTA ("DISSOLVINE AM3-40" available from AkzoNobel Corporate) and sodium acetate. FIG. 1B shows a plot of these results. In contrast to EDTA, GLDA and sodium acetate were readily biodegradable.

Table 2 compares the biodegradability of GLDA and EDTA and summarizes chemical oxygen demand (COD) tests which indirectly measures the amount of organic compounds in water. COD test results of both GLDA and EDTA indicate that both chelants are mild organic pollutants in water.

GLDA was also tested for its eco-toxicological effect on various environmental subjects. In particular, the active toxicity of GLDA was measured on various organisms following OECD 201, 202 and 203 protocols. These results are summarized in Table 1 below.

Thus, Example 1 illustrates that compared to EDTA, GLDA is readily biodegradable. Furthermore, GLDA is an ecologically friendly material.

TABLE 1

| Toxicity Test | Result |
| --- | --- |
| Active toxicity test of GLDA on Rainbow trout (*Oncorhynchus mykiss*; OECD 203) | 96-h LC50 > 100 mg/l; 96-h NOEC ≥ 100 mg/l |
| Active toxicity test of GLDA on *Daphnia magna* (OECD 202) | 48-h EC50 > 100 mg/l; 48-h NOEC ≥ 100 mg/l |
| Active toxicity test of GLDA on Alga (OECD 201) | 72-h EC50 > 100 mg/l; 72-h NOEC ≥ 100 mg/l |

TABLE 2

| Chelant | Biodegradability | COD |
| --- | --- | --- |
| EDTA | Difficult | ~315 mg/g |
| GLDA | Easy | 345-385 mg/g |

EXAMPLE 2

Several chelating agents and acids (breaker systems) were tested for their calcium carbonate dissolving capacity and miscibility in fresh water. Tests of the breaker systems were performed by adding a known volume of breaker system to a volume of brine needed to fill 100 ml in a jar. The jars were then sealed and swirled to mix the components. Samples containing 5%, 10%, or 20% v/v of chelating agents and acids were prepared. The jars were then placed in a static oven at 150° F. for 16 hours. Afterwards, miscibility of the components was observed and the pH of each mixture was tabulated.

The calcite dissolving capacity of each breaker system was determined in the following manner. A known amount of a technical grade calcium carbonate (commercially available from Halliburton under the tradename "BARACARB 5") was dried in an oven for 2 hours. A 2.5 g portion of BARACARB 5 calcium carbonate was then stirred into a 50 mL solution of the test fluid and allowed to stand for one hour. The solution was subsequently filtered with a 1 micron fiber glass filter paper. The filtered residue was allowed to dry in the oven for an hour at about 105° F. The dissolved carbonate percentage was calculated by measuring the difference between the weight of the starting material and dried weight of BARACARB 5 calcium carbonate left on the filter paper.

All of the tested chelating agents and acids were miscible with fresh water and displayed no phase separation. In general, the reactivity rates with the carbonate were proportional to the dissociation constants of the chelating agents and acids. Table 3 below summarizes the results of the dissolution and miscibility experiments. GLDA demonstrated slightly lower dissolution of carbonate as compared to EDTA and acid. This relatively slower dissolution rate could be advantageous in situations where delayed filter cake dissolution is desirable.

This Example illustrates, among other things, the dissolving capacity of GLDA and its miscibility with fresh water.

TABLE 3

| Material | pH | Miscibility with Fresh Water | Final Weight of BARACARB 5, g | % Carbonate Complexed or Dissolved |
| --- | --- | --- | --- | --- |
| EDTA ammonium salt | 4.77 | Miscible, no phase separation | 1.54 | 38.4 |
| EDTA sodium salt | >12 | Miscible, no phase separation | 1.62 | 35.2 |
| Polyaspartic acid, sodium salt | 10.1 | Miscible, no phase separation | 2.41 | 3.6 |
| Iminodisuccinate, sodium salt | 11.3 | Miscible, no phase separation | 2.37 | 5.2 |
| GLDA | >12 | Miscible, no phase separation | 2.01 | 19.6 |
| Synthetic acid (HCl salt of urea) | 0.88 | Miscible, no phase separation | 1.62 | 35.2 |
| EGTA | 11 | Miscible, no phase separation | 2.32 | 9.28 |

EXAMPLE 3

Dissolution and miscibility tests were also performed on 20% GLDA in sodium bromide brines. 20% GLDA was mixed in various concentration of NaBr in order to evaluate the effect of brine concentration on the dissolving capacity of GLDA. Without being limited by theory, it is believed that reducing the amount of available free water in the brine reduced the dissociation rate of the acid functionalities on the breaker, which in turn reduced the amount of complexed calcium ions. These tests were performed in 20% v/v breaker systems in 10.2 lb/gal KCl/NaBr brine or 12.5 lb/gal NaBr brine. In each case, 2.5 g of BARACARB 5 calcium carbonate was added to the breaker systems at 150° F. for 16 hours. For comparison, a mineral acid breaker system was also tested.

Figure 2:
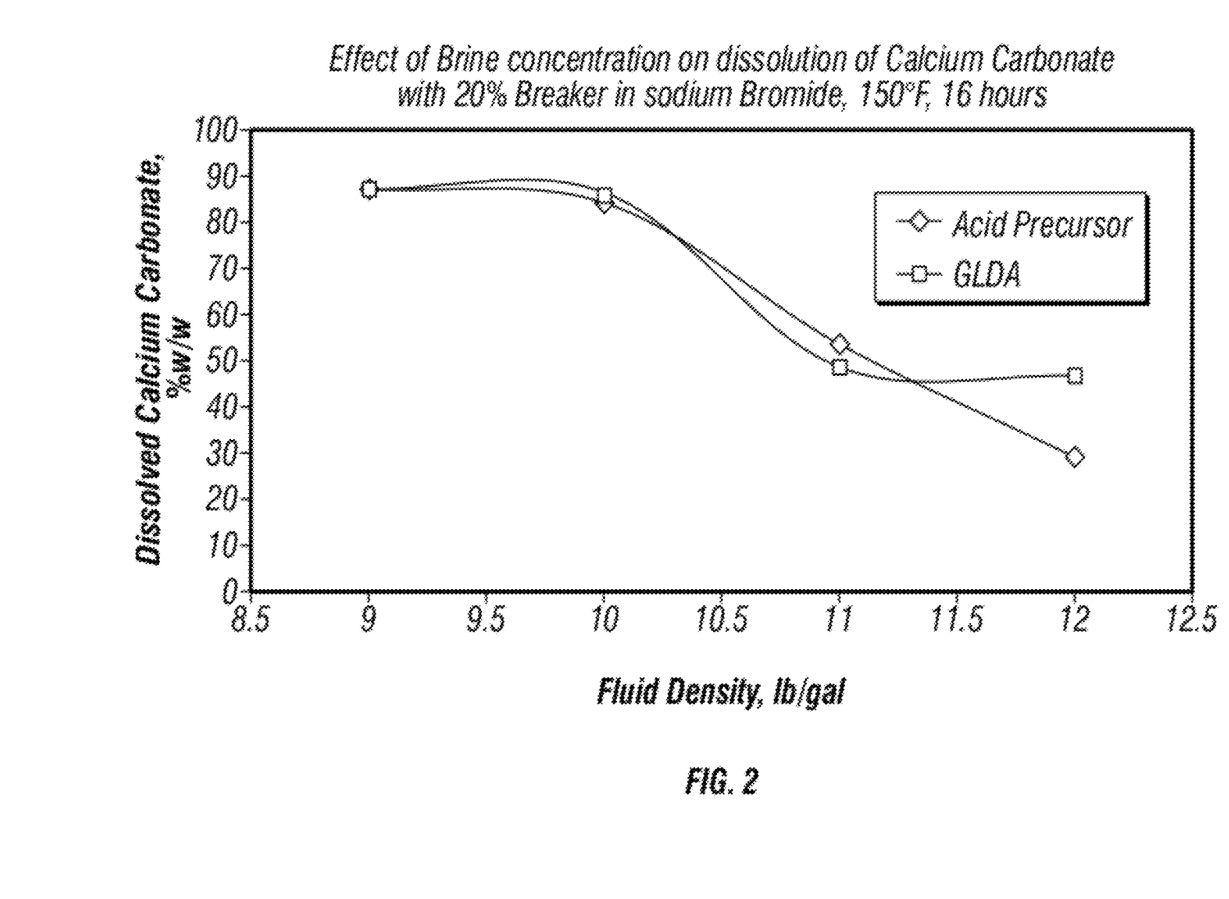
FIG. 2 shows data on the dissolution of calcium carbonate.

FIG. 2 shows that the GLDA breaker fluid dissolved more than about 80% carbonate at a lower brine concentration and a little less than about 45% at a higher brine concentration. Table 4 below shows that GLDA was able to achieve 80 to 90% of the dissolving capacity of the mineral acid without the cloudiness formed by the mineral acid.

Thus, this Example illustrates, among other things, that GLDA is nearly as effective as mineral acid in dissolving calcium carbonate without generating any cloud, phase separation, or precipitate.

TABLE 4

| Material | | Miscibility | Final Weight of BARACARB 5 | % Complexed or Dissolved |
| --- | --- | --- | --- | --- |
| 10.2 lb/gal KCl/NaBr | GLDA | Clear, no precipitate | 1.27 | 49 |
| | Mineral acid | Cloudy, no phase separation, no precipitate | 1.12 | 55 |

TABLE 4-continued

| | Material | Miscibility | Final Weight of BARACARB 5 | % Complexed or Dissolved |
|---|---|---|---|---|
| 12.5 lb/gal NaBr | GLDA | Clear, no precipitate | 1.78 | 29 |
| | Mineral acid | Cloudy, no phase separation, no precipitate | 1.61 | 36 |

EXAMPLE 4

Some common filter cake breaker systems are problematic because of incompatibility and solubility problems. For instance, chelant-based breaker systems can pose environmental concerns such as non-biodegradability while acid-based breaker systems can be corrosive. Chelants also face solubility issues (especially at lower pH's) while acids can form precipitates under certain conditions.

In this Example, several breaker additives, including a commercially available filter cake breaker system ("N-FLOW™" additive available from Halliburton Energy Services, Inc.), EDTA ("DISSOLVINE AM2-45" available from AkzoNobel Corporate), GLDA ("DISSOLVINE GL-47S" available from AkzoNobel Corporate), and synthetic acid ("Oil Safe AR®," available from Heartland Solutions, Inc.) were tested for their initial and over time miscibilities in three fluid densities of potassium formate brines. Completion breaker solutions were to be tested at 5%, 10%, and 20% by volume concentrations in each of the brines. The initial miscibility and the miscibility after static aging overnight at 150° F. were observed. Also, the pH of the final mixes was measured. The different concentrations of the breaker solutions were prepared with fresh water and filtered through a 1.6 μm glass fiber filter prior to testing.

The tests were run by adding the appropriate volume of the test breaker (5%, 10%, or 20% by volume) to the volume of the test brine needed to total 100 ml in a 4 ounce jar, sealing it, and swirling to mix the components. Observation was noted of the compatibility of the components. Another observation on the miscibility of the components and the pH was made after placing the jar overnight in a static oven at 150° F. A summary of these results including observed pH's is shown in Table 5 below.

TABLE 5

| | pH | | | |
|---|---|---|---|---|
| Additive | Initial | Final* | Initial Observation | After Static Aging |
| Fluid Density 11.0 lb/gal | | | | |
| Blank | 11.9 | 11.7 | Clear | Clear |
| N-FLOW 325-5% | — | 6.2 | Not miscible, floats on top | Clear, miscible |
| N-FLOW 325-10% | — | 5.6 | Not miscible, floats on top | Clear, miscible |
| N-FLOW 325-20% | — | 5.1 | Not miscible, floats on top | Clear, not all miscible |
| EDTA ammonium salt 5% | — | 9.6 | Clear, totally soluble | Clear, totally soluble † |
| EDTA ammonium salt 10% | — | 8.6 | Clear, totally soluble | Clear, totally soluble † |
| EDTA ammonium salt 20% | — | 7.0 | Clear, totally soluble | Clear, totally soluble † |
| GLDA 5% | — | 12.7 | Clear, totally soluble | Clear, totally soluble |
| GLDA 10% | — | 13.3 | Clear, totally soluble | Clear, totally soluble |
| GLDA 20% | — | 13.7 | Clear, totally soluble | Clear, totally soluble |
| Syn. Acid 5% | — | 9.9 | Cloudy, dispersible, but not soluble | Slight haze |
| Syn. Acid 10% | — | 7.0 | Cloudy, dispersible, but not soluble | Slight haze, slight insoluble |
| Syn. Acid 20% | — | 6.0 | Cloudy, dispersible but not soluble | Slight haze, slight insoluble |
| Fluid Density 12.0 lb/gal | | | | |
| Blank | 12.7 | 12.4 | Clear | Clear |
| N-FLOW 325-5% | — | ** | Not miscible, floats on top | Not totally miscible, some floats |
| N-FLOW 325-10% | — | ** | Not miscible, floats on top | Not totally miscible, some floats |
| N-FLOW 325-20% | — | ** | Not miscible, floats on top | Not totally miscible, some floats |
| EDTA ammonium salt 5% | — | 10.8 | Clear, totally soluble | Clear, totally soluble † |
| EDTA ammonium salt 10% | — | 9.8 | Clear, totally soluble | Clear, totally soluble † |
| EDTA ammonium salt 20% | — | 8.0 | Clear, totally soluble | Clear, totally soluble † |
| GLDA 5% | — | 13.3 | Clear, totally soluble | Clear, totally soluble |
| GLDA 10% | — | 14.4 | Clear, totally soluble | Clear, totally soluble |

TABLE 5-continued

| Additive | pH Initial | pH Final* | Initial Observation | After Static Aging |
|---|---|---|---|---|
| GLDA 20% | — | 14.7 | Clear, totally soluble | Clear, totally soluble |
| Syn. Acid 5% | — | 11.4 | Clear, totally soluble | Very slight separation |
| Syn. Acid 10% | — | 9.4 | Cloudy, dispersible, but not soluble | Slight separation around top |
| Syn. Acid 20% | — | 7.0 | Cloudy, dispersible, but not soluble | Slight separation around top |
| Fluid Density 13.0 lb/gal | | | | |
| Blank | 13.6 | 13.5 | Clear | Clear |
| N-FLOW 325-5% | — | 12.7 | Not miscible, floats on top | Not miscible, floats on top |
| N-FLOW 325-10% | — | 12.1 | Not miscible, floats on top | Not miscible, floats on top |
| N-FLOW 325-20% | — | 12.0 | Not miscible, floats on top | Not miscible, floats on top, yellowed |
| EDTA ammonium salt 5% | — | 11.4 | Clear, totally soluble | Clear, totally soluble † |
| EDTA ammonium salt 10% | — | 10.7 | Clear, totally soluble | Clear, totally soluble † |
| EDTA ammonium salt 15% | — | 9.9 | Clear, totally soluble | Clear, totally soluble † |
| GLDA 5% | — | 13.8 | Clear, totally soluble | Clear, totally soluble |
| GLDA 10% | — | 15.0 | Clear, totally soluble | Clear, totally soluble |
| GLDA 20% | — | 15.4 | Clear, totally soluble | Clear, totally soluble |
| Syn. Acid 5% | — | 12.2 | Cloudy, dispersible, but not soluble | Hazy |
| Syn. Acid 10% | — | 11.0 | Cloudy, dispersible, but not soluble | Hazy, slight separation at top, a few crystals on bottom |
| Syn. Acid 20% | — | 7.5 | Cloudy, dispersible, but not soluble | Hazy, slight separation at top, a lot of crystals on bottom |

*Final pH after static 16 hrs @ 150° F.
** pH was not measured on these fluids because the pH probes had gas bubbles form on them when placed into the fluid.
† These fluids gave off a strong ammonia odor when opened.

These results indicate that chelating agents GLDA and EDTA are soluble in the tested concentrations of the potassium formate brine. Moreover, the pH of the samples increased with increasing potassium formate concentrations. The relatively higher pH's observed for GLDA as compared to the test brine and EDTA can be attributed to the high $pK_b$.

In contrast, the solubility of the acid precursor decreased with increasing concentrations of the potassium formate brine. The mineral acid was not fully miscible in any of the brines. Furthermore, the initial pH could not be measured due to the small bubbles forming on the pH probes as soon as they were immersed. The synthetic acid was also not soluble in the brines, but dispersed evenly. After holding the temperature static at 150° F., there was a haze to the fluids and some slight separation at the top of the fluid level. In the 13.0 lb/gal brine, crystals formed on the bottom of the solution.

This Example suggests, among other things, the desirable miscibility characteristics of GLDA in various concentrations of brine.

EXAMPLE 5

The destruction of metals by corrosion typically occurs by direct chemical attack at elevated temperatures in a dry environment or by electrochemical process at lower temperatures in a water-wet or moist environment. Corrosion can occur because metals tend to revert to a more stable form, e.g., oxides, sulfates, sulfides, or carbonates. Without being limited by theory, it is believed that reacted (buffered) fluids generally have low corrosion rate. However, when the breaker solution is not buffered, corrosion can be severe. This corrosion can create a damaging downhole situation if the breaker system does not contact a sufficient amount of carbonate filter cake.

To test the potential downhole destruction of metals, the corrosion of metals were tested in non-buffered fluids at 10% (see Table 6 below) concentration level of the breaker system in 11 lb/gal NaBr brine. These experiments were carried out at various test temperatures for 7 days in the following manner.

The corrosion effect of breaker systems was evaluated by completely immersing a mild carbon steel corrosion test coupon (purchased from Fann Instrument Company, Houston, Tex.) in NaBr test fluid at elevated temperatures. Duplicate coupons were used in each test in separate jars. Each coupon was placed against the inner wall of the jar in a vertical position while the test fluid was added. All tests were run at a volume-to-surface area ratio of about 20 ml/square inch. Next, the jar was placed in an oven at 105° F. or 150° F. After 7 days, the coupons were removed, cleaned and dried. The corrosion rate was calculated by determining the weight loss of the coupon.

Table 6 indicates that GLDA is less corrosive than the tested acid precursor breaker at both breaker concentration levels and temperature conditions. Furthermore, in comparison with the acid precursor, GLDA displayed a much lower increase in the corrosion rate at both the higher breaker concentration and the higher temperature.

TABLE 6

| Test Temp, °F. | Product | Average Initial Weight, g | Average Final Weight, g | Corrosion Rate, mm/yr |
|---|---|---|---|---|
| 150 | GLDA | 24.4851 | 24.1828 | 19.1 |
| | Acid Precursor | 21.2267 | 21.1064 | 23.6 |
| | EDTA | 21.4851 | 20.5323 | 60.2 |
| 105 | GLDA | 21.3860 | 21.0267 | 7.6 |
| | Acid Precursor | 21.4309 | 21.27 | 10.2 |
| | EDTA | 21.3860 | 21.0267 | 24.7 |

EXAMPLE 6

In order to compare filter cake removal ability, GLDA, EDTA and acid precursor (available from Halliburton Energy Services, Inc. under tradename "N-FLOW") were tested in the following manner. The formulation of the drill-in fluid used for filter cake deposition was characterized and summarized in Table 7 below. A synthetic drill-in fluid was made by mixing the required additives and polymers (xanthan and starch derivative) as well as bridging materials in a blender for about 60 minutes. This fluid was placed in an oven at 150° F. for 16 hours. The fluid was then removed from the oven, cooled and remixed for 10 minutes. Filter cake was then formed by filtering the drill-in fluid for about 2 hours through an aloxide disk (available from Fann Instrument Company, Houston, Tex.) at 500 psid and at the required temperature. The aloxide disks were placed in a HPHT filtration cell (available from Fann Instrument Company, Houston, Tex.) and allowed to cool. After cooling, the remaining drill-in fluid was carefully poured out and replaced with breaker systems of known volume percent in an appropriate brine. The yield point value of the drill-in fluid was 25 lb/100 ft$^2$.

Figure 3A:
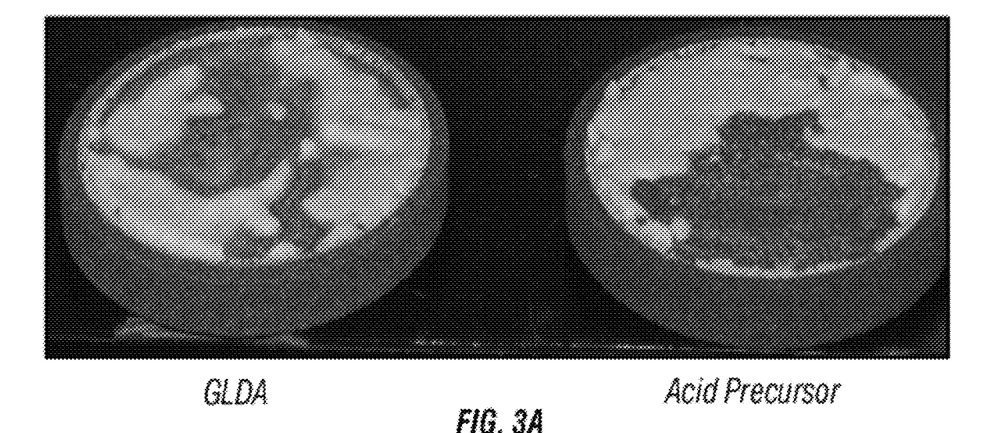
FIG. 3A-3B shows filter cake removal by breaker systems.
Figure 3B:
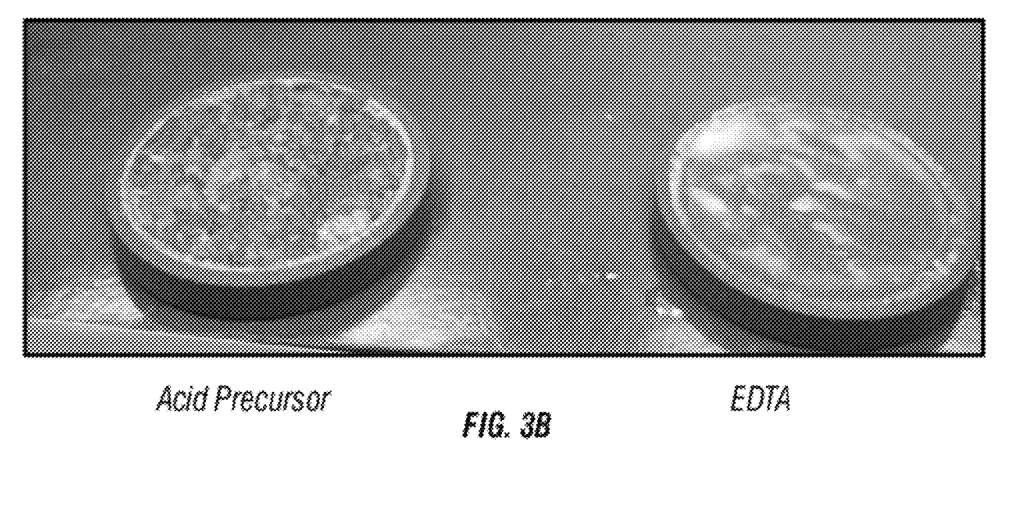

FIGS. 3A-3B show the filter cakes remaining on the aloxide disks after soaking in the breaker system for 16 hours at either 100° F. or 150° F. FIG. 3A (left) shows the filter cake remaining after soaking in 20% GLDA (11 lb/gal NaBr) at 100° F. FIG. 3A (right) shows the filter cake remaining after soaking in 20% acid precursor (11 lb/gal NaBr) at 100° F. FIG. 3B (left) shows the filter cake remaining after soaking in 20% mineral acid at 150° F. FIG. 3B (right) shows the filter cake remaining after soaking in 20% EDTA at 150° F. In the case of GLDA, it is apparent that the cake integrity had been compromised by the dissolution of the calcium carbonate, making it possible for the fluid in the HPHT filtration cell to flow through the disk.

Overall, in comparison to acid precursor, GLDA was able to remove nearly the same amount (approximately 60%) of filter cake from the aloxide disk. However, removal of the filter cake with GLDA was much more evenly spread out even at the low temperature. In contrast, the acid precursor showed localized removal of filter cake. Uniform degradation is highly desirable in downhole conditions where filter cakes can span thousands of feet, thus allowing the reservoirs to communicate with the well bore. Without being limited by theory, this uniform removal of the filter cake suggests that GLDA is removing or dispersing the polymer and other components contained in the filter cakes which is a surprising effect. Not surprisingly, EDTA was also effective in uniformly removing the filter cake in comparison with the acid precursor.

FIGS. 3A-3B also show minimal wormhole effects on the GLDA treated filter cake. Wormhole effects are typically seen in carbonate core materials and show up when an acid finds a localized surface area rather than acting on the surface evenly. As a result, the acid attacks a local set of pores and enlarges the pore throats. Typically, wormholes can range from 1/8" to 1/2" depending on the acid, temperature and formation material. Uniform removal of the filter cake suggests that wormholes are not being formed. Wormholes can cause several unwanted effects in various downhole applications.

Thus, this test suggests that GLDA is able to remove filter cake as effectively and more uniformly as compared to the acid precursor while having fewer undesirable wormhole effects. GLDA is nearly as effective as EDTA in uniformly removing the filter cake, but provides fewer environmental concerns. The uniform filter cake removal by GLDA also minimizes the formation of wormholes, which is highly undesirable in certain circumstances.

TABLE 7

| Fluid | Unit | 1.00 |
|---|---|---|
| Products & Units | | |
| Density | lb/gal | 9.40 |
| Water | Bbl | 0.83 |
| NaCl | Ppb | 96.40 |
| Defoamer | Ppb | 0.01 |
| Viscosifier | Ppb | 0.75 |
| NaOH | Ppb | 0.50 |
| Starch | Ppb | 8.00 |
| Calcium Carbonate | Ppb | 40.00 |
| Sodium Sulfite | Ppb | 0.50 |
| Hot-rolled at 150° F. | hr | 16.00 |
| Remixed on a Multi-mixer | Min | 10.00 |
| Plastic viscosity | cP | 16.00 |
| Yield point | 100 lb/ft2 | 25.00 |
| 10 Sec gel | 100 lb/ft2 | 5.00 |
| 10 Min gel | 100 lb/ft2 | 11.00 |
| API Fluid Loss, cc/30 min | mL/min | 7.00 |

EXAMPLE 7

To simulate the performance of a breaker solution in potential downhole applications, a 20% GLDA solution in 11 lb/gal sodium bromide was used in a multiple step return permeability test on a low permeability Berea Sandstone core plug. The following procedure was used.

A 1.0" diameter core plug was cut out of a Berea Sandstone block having low permeability (about 20% porosity). The core plug was inserted into a containment sleeve of a manual return permeameter (MRP). The pressure chamber was sealed and the temperature was maintained at approximately 110° F., while the confining pressure was at approximately 2,500 psi. Once the temperature and overburden pressure stabilized, isoparaffin solvent ("SOLTROL® 170" commercially available from Chevron Phillips Chemical Company) filtered to 0.45 micron, was produced through the core at 4 ml/min against approximately 200 psi back-pressure. After establishing constant permeability with SOLTROL® 170, the flow was stopped. The initial and final permeability values were calculated using Darcy's Law for linear flow:

$$K = \frac{(Q \mu L)(14700)}{(60 \, \Delta p \, A)}$$

Where;
K=permeability in mD
Q=flow rate, cc/min
μ=Viscosity of the fluid @ 100° F.=1 cP
L=length of core plug, cm
14700=conversion factor (atm to psi and darcy to millidarcy)
60=conversion factor from cc/min to cc/sec
ΔP=pressure drop, psi
A=cross sectional area of core plug, cm$^2$ Treatment simulation in the lab involved three separate steps, each step potentially causing formation damage or a reduction in permeability. The first step involved introducing a drill-in fluid into the core cell, thereby displacing SOLTROL® 170, which was followed by the second step of holding the drill-in fluid pressure across the core at 500 psid for 2 hours to deposit the filter cake while collecting the filtrate. The third step involved displacing the drill-in fluid from the test lines and chamber by pumping SOLTROL® 170 at 10 ml/min for 15 min. Once the displacement of the drill-in fluid was complete, the damage caused by the previous three injection steps was evaluated by pumping of SOLTROL® 170 through the core until a constant permeability was obtained using the same procedure used for the initial permeability.

The flow was consequently stopped and a breaker fluid solution was introduced by the same method used for the drill-in fluid to place the fluid in the core chamber. Flow of the breaker fluid was allowed to pass through the core and then stopped after one pore volume of the fluid was collected. The system was left to soak in the breaker fluid for 16 hours at the test temperature.

Figure 4:
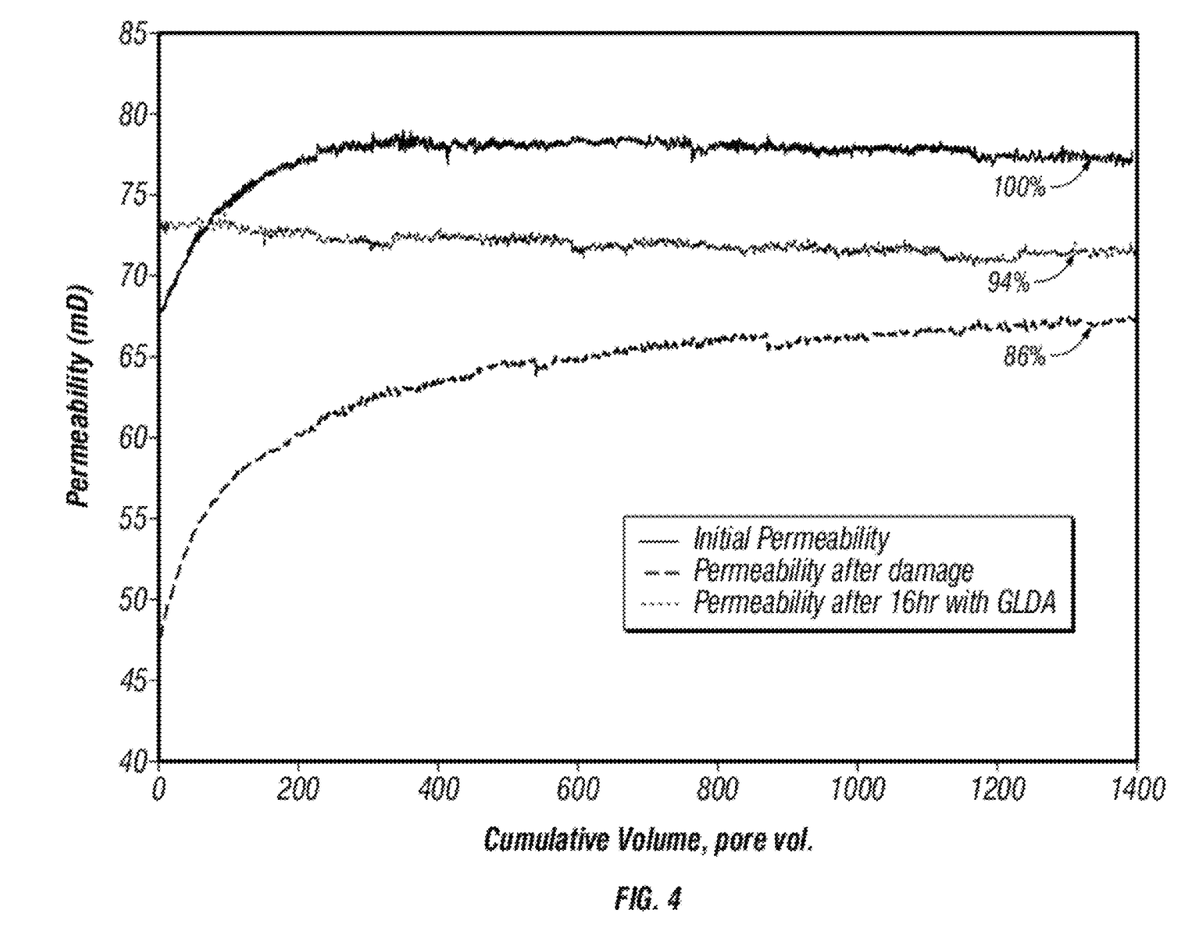
FIG. 4 shows data on permeability of Berea Sandstone in potential downhole conditions.

FIG. 4 illustrates the initial permeability obtained from the core plug before and after damaging the core as well as after treatment with the breaker fluid and restarting the flow of soltrol 170 at a constant flow rate of 4 mL/min. The permeability returned to 86% of the initial value after damaging treatment with the drill-in fluid. Thereafter, the breaker was pumped through the core plug at a slow rate of 2 mL/min, 200 psi, and collected one pore volume of fluid before stopping the flow. The return permeability after the breaker cleanup for 16 hours was calculated to be 94% of the initial permeability.

Thus, this Example suggests, among other things, that GLDA is effective to break filter cakes in downhole conditions and applications. GLDA is also able to immediately restore regain permeability of Berea Sandstone under simulated downhole temperature, pressure and chemical conditions.

EXAMPLE 8

In this Example, the compatibility and dissolution ability of various breaker systems with formate brine were evaluated. The breaker samples include an acid precursor ("N-FLOW™ 325" commercially available from Halliburton Energy Services, Inc.), EDTA, and GLDA. For each sample a 20% v/v breaker sample was prepared in three different concentrations of potassium formate brine (11 ppg, 12 ppg, and 13 ppg).

To determine the compatibility of each breaker with the potassium formate brine, each sample was checked for the formation of formate salts. This precipitation was indicative of an incompatibility of the breaker system with the formate brine. These compatibility results are shown in Table 8 below. Samples in which precipitation was observed are noted with an asterisk (*). Table 8 shows that the acid precursor was incompatible with the formate brine at each of the tested concentrations. EDTA was only compatible with the formate brine at the lowest tested concentration while GLDA was fully compatible with the formate brine.

The dissolution ability of the breaker systems was also tested in the various concentration of formate brine. In each test, 2.5 g of calcium carbonate was added to jars which contained the breakers. The jars were then dried in an 90° F. oven for 16 hours. After the elapsed time, the amount of carbonate that remained was weighed and tabulated. The difference in weight represented the amount of carbonate that was dissolved by the breaker system and/or precipitated out as a result of being incompatible with the formate brine. The measured weights and percentages are summarized in Table 8 below. Table 8 shows that at the lower formate concentration (11 ppg), EDTA showed relatively high dissolution ability. GLDA showed much lower dissolution ability as compared to EDTA at 11 ppg formate concentration. However, GLDA was the only breaker which was compatible with formate brine at the higher concentrations.

This Example shows, among many things, that of the breaker systems tested, only GLDA is fully compatible with potassium formate brine in the concentration ranges tested. After drying in the oven, the GLDA systems generally contained larger amounts of carbonate than the acid precursor or EDTA. However, this was partly due to the precipitation observed in the acid and EDTA systems. While EDTA showed higher dissolution ability at the lowest brine formate concentration, GLDA may be the only viable breaker at the higher formate concentrations due to precipitation of formate salts.

TABLE 8

| | 11 ppg Potassium Formate | | 12 ppg Potassium Formate | | 13 ppg Potassium Formate | |
|---|---|---|---|---|---|---|
| | Amount of carbonate remaining, g | % Dissolved or precipitated out | Amount of carbonate remaining, g | % Dissolved or precipitated out | Amount of carbonate remaining, g | % Dissolved or precipitated out |
| N-Flow 325 | 0.26* | 90 | 0.40* | 84 | 1.25* | 50 |
| EDTA | 0.21 | 92 | 0.28* | 89 | 1.10* | 56 |
| GLDA | 1.05 | 48 | 1.67 | 33 | 2.00 | 20 |

*Precipitation occurred in the system, forming formate salts which dissolved on the filter paper by rinsing with water. Therefore, the remaining amount is not as a result of dissolution of the carbonate. Precipitation of the salts is indicative of incompatibility of the breaker system with the formate brine.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a water-based treatment fluid comprising water, a bridging agent, and a polymer;
depositing the bridging agent and the polymer as a filter cake along a wall of a well bore in a subterranean formation; and
degrading both the bridging agent and the polymer of the filter cake with a filter cake clean-up fluid comprising an aqueous fluid and L-glutamic acid N,N-diacetic acid.

2. The method of claim 1, wherein the bridging agent comprises at least one selected from the group consisting of: calcium carbonate, magnesium citrate, calcium citrate, calcium succinate, calcium maleate, calcium tartrate, magnesium tartrate, bismuth citrate, hydrates thereof, and any combination thereof.

3. The method of claim 1, wherein the filter cake clean-up fluid has a temperature of about 120° F. or lower.

4. The method of claim 1, wherein the filter cake clean-up fluid further comprises at least one selected from the group consisting of: a corrosion inhibitor, a surfactant, an iron reducing agent, a viscosifier, and any combination thereof.

5. The method of claim 4, wherein the surfactant is present in an amount ranging from about 0.01% to about 5% by volume of the filter cake clean-up fluid.

6. The method of claim 1, wherein the pH of the filter cake clean-up fluid is about 5 or higher.

7. The method of claim 1, wherein the L-glutamic acid N,N-diacetic acid is present in an amount of about 10% to about 15% by volume of the filter cake clean-up fluid.

8. The method of claim 1, wherein the aqueous fluid is fresh water, salt water, brine, or seawater.

9. A method comprising:
providing a filter cake clean-up fluid comprising an aqueous fluid and L-glutamic acid N,N-diacetic acid;
contacting a filter cake that comprises a polymer and a bridging agent with the filter cake clean-up fluid, the filter cake having been deposited along a wall of a well bore from a water-based treatment fluid comprising water; and
degrading both the bridging agent and the polymer of the filter cake with the filter cake clean-up fluid.

10. The method of claim 9, wherein the filter cake further comprises at least one selected from the group consisting of: a weighting agent, a formation fine, a drilling particle, a surfactant, and any combination thereof.

11. The method of claim 9, wherein the bridging agent comprises at least one selected from the group consisting of: calcium carbonate, magnesium citrate, calcium citrate, calcium succinate, calcium maleate, calcium tartrate, magnesium tartrate, bismuth citrate, hydrates thereof, and any combination thereof.

12. The method of claim 9, wherein the filter cake clean-up fluid further comprises at least one selected from the group consisting of: a corrosion inhibitor, a surfactant, an iron reducing agent, a viscosifier, and any combination thereof.

13. The method of claim 9, wherein the L-glutamic acid N,N-diacetic acid is present in an amount of about 0.25% to about 25% by volume of the filter cake clean-up fluid.

14. The method of claim 9, wherein the aqueous fluid is fresh water, salt water, brine, or seawater.

15. A method comprising:
providing a filter cake on a surface in a subterranean formation, the filter cake comprising a polymer and a bridging agent and having been deposited along a wall of a well bore from a water-based treatment fluid comprising water;
providing a filter cake clean-up fluid that comprises an aqueous fluid and L-glutamic acid N,N-diacetic acid, the filter cake clean-up fluid having a pH of about 5 or higher; and
contacting the filter cake with the filter cake clean-up fluid so that a portion of the subterranean formation neighboring the filter cake has a regain permeability of at least about 86%.

16. The method of claim 15, wherein the filter cake comprises at least one selected from the group consisting of: a weighting agent, a formation fine, a drilling particle, a surfactant, and any combination thereof.

17. The method of claim 15, wherein the bridging agent comprises at least one selected from the group consisting of: calcium carbonate, magnesium citrate, calcium citrate, calcium succinate, calcium maleate, calcium tartrate, magnesium tartrate, bismuth citrate, hydrates thereof, and any combination thereof.

18. The method of claim 15, wherein the filter cake clean-up fluid further comprises at least one element selected from the group consisting of: a corrosion inhibitor, a surfactant, an iron-reducing agent, a viscosifier, and any combination thereof.

19. The method of claim 15, wherein the L-glutamic acid N,N-diacetic acid is present in an amount of about 10% to about 15% by volume of the filter cake clean-up fluid.

20. The method of claim 15, wherein the aqueous fluid is fresh water, salt water, brine, or seawater.

* * * * *